(12) United States Patent
Kim et al.

(10) Patent No.: US 12,218,801 B2
(45) Date of Patent: Feb. 4, 2025

(54) ADAPTIVE DEEP LEARNING INFERENCE APPARATUS AND METHOD IN MOBILE EDGE COMPUTING

(71) Applicant: ELECTRONICS AND TELECOMMUNICATIONS RESEARCH INSTITUTE, Daejeon (KR)

(72) Inventors: Ryang Soo Kim, Gwangju (KR); Geun Yong Kim, Gwangju (KR); Sung Chang Kim, Gwangju (KR); Hark Yoo, Gwangju (KR); Jae In Kim, Gwangju (KR); Chor Won Kim, Gwangju (KR); Hee Do Kim, Gwangju (KR); Byung Hee Son, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 520 days.

(21) Appl. No.: 17/519,352

(22) Filed: Nov. 4, 2021

(65) Prior Publication Data

US 2022/0150129 A1    May 12, 2022

(30) Foreign Application Priority Data

Nov. 6, 2020    (KR) .................. 10-2020-0147642
Apr. 29, 2021    (KR) .................. 10-2021-0055977

(51) Int. Cl.
*H04L 41/14*    (2022.01)
*G06N 3/045*    (2023.01)
(Continued)

(52) U.S. Cl.
CPC .......... *H04L 41/145* (2013.01); *G06N 3/045* (2023.01); *G06V 10/82* (2022.01); *G06V 20/56* (2022.01);
(Continued)

(58) Field of Classification Search
CPC ... H04L 41/145; H04L 41/16; H04L 43/0864; H04L 41/5019; G06N 3/045; G06N 20/00; G06V 10/82; G06V 20/56; G06V 20/58
See application file for complete search history.

(56) References Cited

U.S. PATENT DOCUMENTS 9,311,196 B2    4/2016  Kim et al.
11,019,491 B2   5/2021  Lee et al.
(Continued)

FOREIGN PATENT DOCUMENTS

CN    110647382 A  *  1/2020  ......... G06F 9/45558
KR    10-1938455 B1    4/2019
(Continued)

*Primary Examiner* — Tejis Daya
(74) *Attorney, Agent, or Firm* — Rabin & Berdo, P.C.

(57) ABSTRACT

Disclosed is an adaptive deep learning inference system that adapts to changing network latency and executes deep learning model inference to ensure end-to-end data processing service latency when providing a deep learning inference service in a mobile edge computing (MEC) environment. An apparatus and method for providing a deep learning inference service performed in an MEC environment including a terminal device, a wireless access network, and an edge computing server are provided. The apparatus and method provide deep learning inference data having deterministic latency, which is fixed service latency, by adjusting service latency required to provide a deep learning inference result according to a change in latency of the wireless access network when at least one terminal device senses data and requests a deep learning inference service.

17 Claims, 3 Drawing Sheets

(51) Int. Cl.
  *G06V 10/82* (2022.01)
  *G06V 20/56* (2022.01)
  *H04L 41/16* (2022.01)
  *H04L 43/0864* (2022.01)

(52) U.S. Cl.
  CPC .......... *H04L 41/16* (2013.01); *H04L 43/0864* (2013.01)

(56) References Cited

U.S. PATENT DOCUMENTS

| | | | |
|---|---|---|---|
| 11,677,819 B2 * | 6/2023 | Mermoud | G06N 20/10 706/45 |
| 2018/0114098 A1 | 4/2018 | Desai et al. | |
| 2018/0316543 A1 | 11/2018 | Hwang | |
| 2020/0007409 A1 | 1/2020 | Kim et al. | |
| 2020/0327371 A1 | 10/2020 | Sharma et al. | |
| 2021/0126840 A1 * | 4/2021 | Venkataramu | H04L 41/0806 |
| 2021/0282012 A1 | 9/2021 | Lee et al. | |
| 2023/0316087 A1 * | 10/2023 | Mahajan | G06N 3/098 706/25 |

FOREIGN PATENT DOCUMENTS

| | | |
|---|---|---|
| KR | 10-2020-0002615 A | 1/2020 |
| KR | 102164685 B | 10/2020 |
| KR | 10-2020-0130141 A | 11/2020 |

* cited by examiner

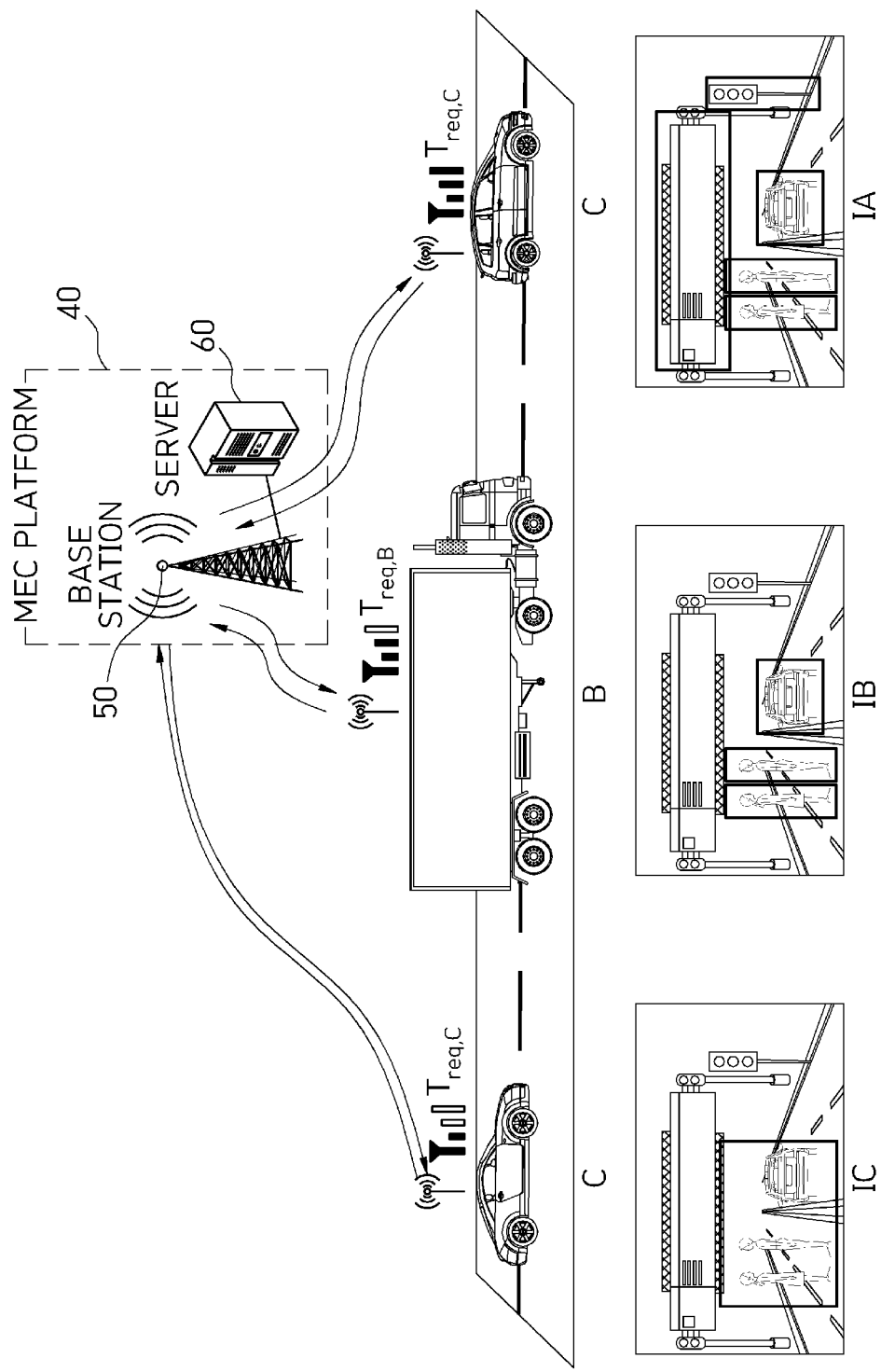

FIG. 4

| TIME REQUIRED FOR DEEP LEARNING INFERENCE | $T_{DLI,A}$ | > | $T_{DLI,B}$ | > | $T_{DLI,C}$ |
|---|---|---|---|---|---|
| PRUNING | (dense network) | | (pruned network) | | (more pruned network) |
| QUANTIZATION | Weights matrix (FP32) | | Weights matrix (FP16) | | Weights matrix (INT8) |
| KNOWLEDGE DISTILLATION | Teacher model / Student model (large) | | Teacher model / Student model (medium) | | Teacher model / Student model (small) |
| ACCURACY OF DEEP LEARNING INFERENCE | BEST | | NORMAL | | TOLERABLE |

ADAPTIVE DEEP LEARNING INFERENCE APPARATUS AND METHOD IN MOBILE EDGE COMPUTING

CROSS-REFERENCE TO RELATED APPLICATIONS

This application claims priority to and the benefit of Korean Patent Application Nos. 2020-0147642 filed on Nov. 6, 2020 and 2021-0055977 filed on Apr. 29, 2021, the disclosure of which is incorporated herein by reference in its entirety.

BACKGROUND

1. Field of the Invention

The present invention relates to mobile edge computing (MEC), image analysis-based object detection, and deep learning inference.

2. Discussion of Related Art

Along with the recent generalization of deep learning technology that analyzes and processes data through deep neural network models such as convolutional neural networks (CNN), deep learning inference technology using mobile edge computing is attracting attention as a method for quickly providing deep learning-based data processing services by using deep learning in various industrial fields.

Mobile edge computing is a 5G core technology in which a computing server is located in a base station of a wireless access network providing network services to support rapid data processing by reducing network latency required for cloud computing.

In the mobile edge computing environment, a deep learning inference service works by transmitting data collected by a mobile terminal to a mobile edge computing server over a wireless access network and by the mobile edge computing server performing deep learning inference computation and transferring a result of the computation to the terminal device over the wireless access network.

Deep learning inference service latency in mobile edge computing includes deep learning inference time required for the mobile edge computing and network latency that occurs when data is transmitted and received over a wireless access network.

At this time, data transfer latency between a terminal device and an edge computing server changes depending on time-varying wireless features such as wireless channel fading and interference, which causes a change in deep learning inference service latency.

As such, the deep learning inference service latency that changes depending on the wireless access network environment is a factor that makes it difficult to apply a mobile edge computing-based deep learning inference data analysis system to a time-sensitive service having to provide data processing results within a certain time.

SUMMARY OF THE INVENTION

In order to provide time-sensitive services such as autonomous driving and XR (VR, AR, etc.) through mobile edge computing, it is necessary to consider not only the time required for data analysis but also network latency occurring in a wireless communication network. Conventional technologies have limitations in providing time-sensitive services because the latency of mobile edge computing-based deep learning data analysis service is affected by a change in wireless data transmission latency.

In order to solve this problem, the present inventors propose an adaptive deep learning inference system that adapts deep learning model inference by considering the wireless network latency variation to ensure end-to-end data processing service latency when providing a deep learning inference service in a mobile edge computing (MEC) environment.

In order to achieve the above objective, the present invention provides an apparatus and method for providing a deep learning inference service performed in a mobile edge computing environment including a terminal device, a wireless access network, and an edge computing server. According to the apparatus and method of the present invention, when at least one terminal device senses data and requests a deep learning inference service, deep learning inference service is adjusted according to a change in latency of a wireless access network and thus capable of providing data processing service with a deterministic (=fixed) latency More specifically, when the terminal device transmits a request for deep learning inference-based data processing over a wireless access network, the request is received, data latency required for data transmission between the terminal device and an edge computing server is measured, and round-trip network latency is calculated. Also, a deep learning model inference computation scheme capable of satisfying a required deterministic latency of an end-to-end deep learning service is selected in consideration of the calculated round-trip network latency, and an inference computation is performed. A result value of the computation is transmitted to the terminal device through a wireless access network.

The configuration and action of the present invention will become more apparent through specific embodiments described below with reference to the drawings.

BRIEF DESCRIPTION OF THE DRAWINGS

FIG. 3 is a conceptual diagram illustrating an embodiment in which an adaptive deep learning inference system is applied to an image analysis-based hierarchical object detection system of an autonomous vehicle according to the present invention; and FIG. 4 is a diagram showing a deep learning model lightweight method for providing adaptive inference services according to the remaining time for deep learning inference computation.

DETAILED DESCRIPTION OF EXEMPLARY EMBODIMENTS

Advantages and features of the present invention and methods of achieving the same will become apparent with reference to preferred embodiments described in detail together with the accompanying drawings. However, the present invention is not limited to the following embodiments and may be implemented in various forms. The embodiments are merely provided to completely disclose the present invention and to fully inform those skilled in the art about the scope of the present invention, and the present invention is defined by the appended claims. Also, terms used herein are only for describing the embodiments while not limiting the present invention. Herein, the singular forms "a," "an," and "one" include the plural unless the context clearly indicates otherwise. Also, the terms "comprises" and/or "comprising" are used to specify the presence of stated elements, steps, operations, and/or components but do not preclude the presence or addition of one or more other elements, steps, operations, and/or components. Hereinafter, the preferred embodiments of the present invention will be described in detail with reference to the accompanying drawings. At this time, detailed descriptions of well-known elements or functions will be omitted if the descriptions may obscure the gist of the present invention.

Figure 1:
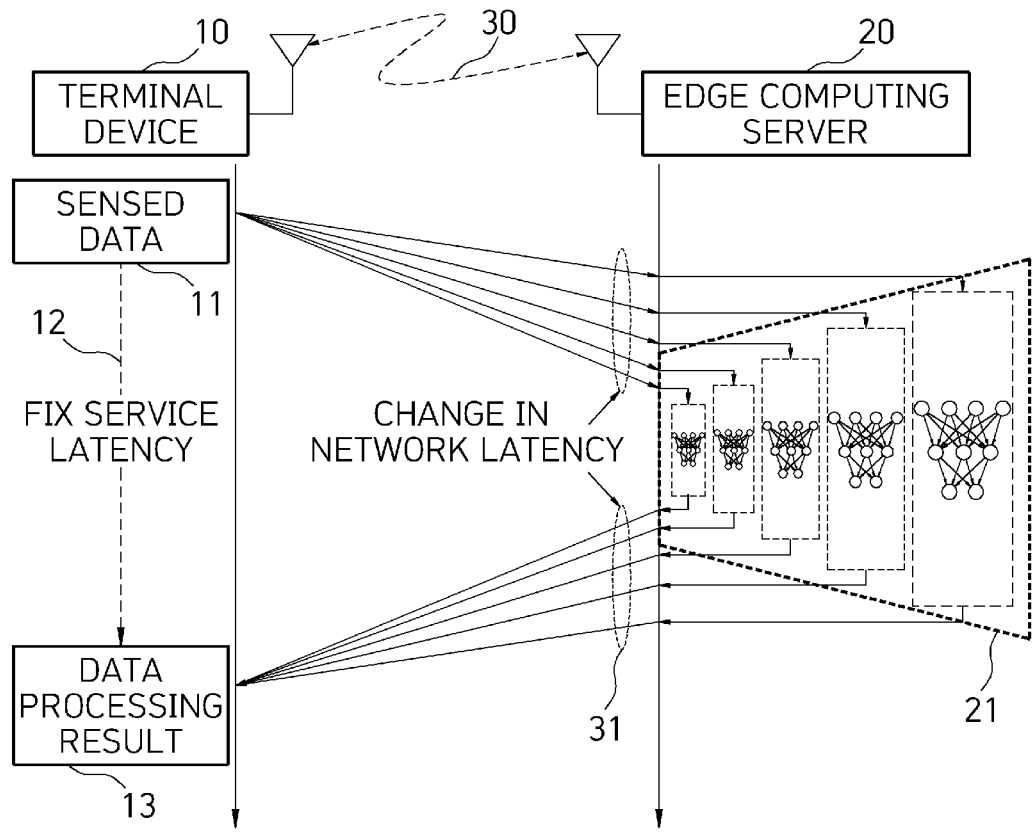
FIG. 1 is a conceptual diagram of a mobile edge computing (MEC)-based deep learning inference system and method according to the present invention.

FIG. 1 illustrates the concept of an adaptive deep learning inference system in a mobile edge computing (MEC) environment according to the present invention.

When a terminal device 10 senses data 11 and requests a deep learning inference service from an edge computing server 20 over a wireless access network 30, the edge computing server 20 executes deep learning inferences using an adaptive deep learning inference system 21 according to the present invention. The adaptive deep learning inference system 21 adjusts latency (service latency) required to provide a deep learning inference result according to a change in latency 31 of the wireless access network 30. The edge computing server 20 finally transmits a "data processing result 13 of deterministic latency 12 with service latency fixed" by the adaptive deep learning inference system 21 to the terminal device 10 to provide the deep learning inference service.

Figure 2:
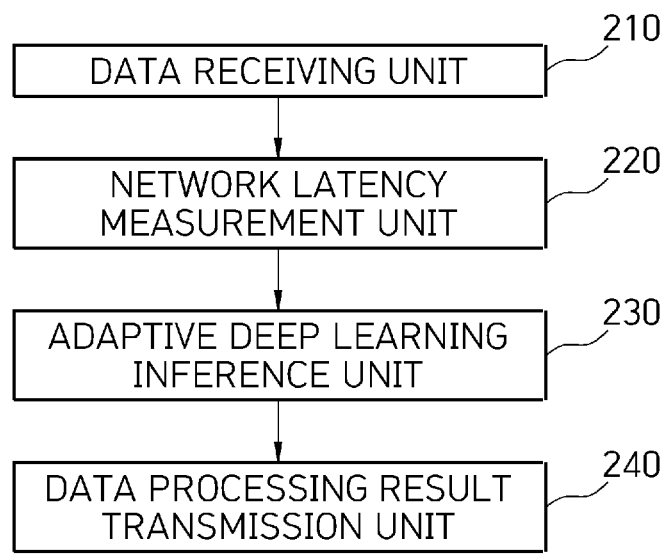
FIG. 2 is a block diagram of an adaptive deep learning inference system and method according to the present invention.

FIG. 2 is a block diagram of an adaptive deep learning inference system and method according to the present invention. FIG. 2 will be described with reference to FIG. 1.

A data receiving unit 210 receives sensed data 11 transmitted over a wireless access network 30 by a terminal device 10 to request deep learning inference-based data processing.

A network latency measurement unit 220 is responsible for calculating round-trip network latency by measuring or predicting data latency required for data transmission between the terminal device 10 and the mobile edge computing server 20.

An adaptive deep learning inference unit 230 is responsible for determining a deep learning model inference computation method that can satisfy a required deterministic latency $t_{req}$ of a deep learning inference service in consideration of the round-trip network latency $T_{net}$ calculated by the network latency measurement unit 220 and performing computation. Here, the deep learning model inference computation selects a deep learning inference scheme that can process data with the maximum performance in the maximum latency $t_{DLI} = t_{req} - t_{net}$ required to perform the deep learning inference computation. Formulated as an optimization problem, this may be expressed as follows.

[Equation 1]

$$M^* = \underset{M \in S_M}{\mathrm{argmax}} f(M), \text{ s.t. } T(M) \leq T_{req} - T_{net} \quad (1)$$

In Equation 1 above, $S_M$ denotes a set of applicable deep learning inference methods, f(M) denotes a deep learning inference performance index value that may be obtained when a deep learning inference method M is used, and T(M) denotes latency required when a deep learning inference method M is used. In this case, the deep learning inference performance index value f(M) may be defined differently depending on the service requirement in an application field where a deep learning model is utilized (e.g., in the case of an object detection service, accuracy (mAP), number of objects (number of classes), etc.).

A data processing result transmission unit 240 transmits a result value of data processing of the adaptive deep learning inference unit 230 to the terminal device 10 using the wireless access network 30.

The adaptive deep learning inference system and method shown in FIG. 2 may be implemented in a software program. Also, all of the components shown in FIG. 2 may be built in the edge computing server 20 using an adaptive deep learning inference program. However, depending on the application, the components may be distributed in different physical areas. For example, in the case of an autonomous-vehicle object detection system having a base station between an autonomous vehicle and an edge computing server, the data receiving unit 210 and a data processing result transmission unit 240 are built in the base station, and the network latency measurement unit 220 and the adaptive deep learning inference unit 230 may be built in the edge computing server (this will be described in detail below with reference to FIG. 3).

FIG. 3 is a conceptual diagram illustrating an embodiment in which an adaptive deep learning inference system is applied to an image analysis-based hierarchical object detection system of an autonomous vehicle according to the present invention. In general, a method of implementing hierarchical object detection can be implemented by generating a deep learning model for each hierarchical layer or generating a plurality of hierarchical output layers in a single deep learning model. How the adaptive deep learning inference system proposed by the present invention can be applied to the hierarchical object detection will be described below.

As shown in FIG. 3, autonomous vehicles A, B, and C traveling on a road have different data latency depending on simultaneous wireless communication usage of adjacent vehicles and distances from a base station 50 of a multi-access edge computing (MEC) platform 40 providing an adaptive deep learning inference service of the present invention. The autonomous vehicles A, B, and C requesting an image analysis-based object detection service transmit image data IA, IB, and IC for object detection to the MEC platform 40 over a wireless network. At this time, the autonomous vehicle generates a data packet by adding time information $t_1$ regarding when transmitting data to a wireless network, deep learning inference service latency (i.e., the time required for inference service) $T_{req,A}$, $T_{req,B}$, $T_{req,C}$, image data, and deep learning-based object detection service requirements is started to the data packet and then transmits the data packet.

The data receiving unit 210 of the base station 50 of the MEC platform 40 receives the packet data transmitted by the vehicle and transfers a packet requesting a deep learning object detection service to a server 60 in the MEC platform 40. In this case, the data receiving unit 210 of the base station 50 generates a packet by adding time information $t_2$ regarding when wireless data is received to the data and transmits the packet to the server 60.

After receiving the packet from the data receiving unit 210 of the base station 50, a network latency measurement unit 220 of the server 60 measures uplink data transmission latency required for uplink data transmission using the time information $t_1$ and $t_2$ included in the packet, predicts downlink data transmission latency, and calculates network latency $t_{net}$. In this case, the prediction of the data transmission latency may be performed through various technologies or techniques. The network latency measurement unit 220 calculates time $T_{DLI,A}$, $T_{DLI,B}$, $T_{DLI,C}$ required for deep learning inference computation by using the predicted network latency $t_{net}$ and the deep learning inference service latency $T_{req,A}$, $T_{req,B}$, $T_{req,C}$. Subsequently, the network latency measurement unit 220 transfers the image data and deep learning-based object detection service requirements transmitted from the vehicle and the calculated time $T_{DLI,A}$, $T_{DLI,B}$, $T_{DLI,C}$ required for deep learning inference computation to the adaptive deep learning inference unit 230.

The adaptive deep learning inference unit 230 determines a deep learning inference model candidate group on the basis of the image data and deep learning-based object detection service requirements transferred from the network latency measurement unit 220, selects a model with the highest object detection level from among deep learning inference models capable of deep learning computation processing within the time required for deep learning inference computation, performs the deep learning inference computation, and then transfers result data of the deep learning inference computation to the data processing result transmission unit 240 of the base station 50.

The data processing result transmission unit 240 of the base station 50 generates a data processing result transferred from the adaptive deep learning inference unit 230 in the form of a packet and then sends the data packet to the autonomous vehicles A, B, and C on the road over a wireless network. At this time, as one implementation method for ensuring end-to-end service latency in transferring the data packet from the base station 50 to a corresponding vehicle, a method of securing, in advance, a schedule for transmitting a corresponding data packet in a wireless network downlink transmission schedule of a base station may be used.

In the embodiment of FIG. 3, it is assumed that a great deal of time is required for deep learning inference computation measured by the network latency measurement unit 220 in the order of the autonomous vehicles A, B, and C. That is, the relationship between the time $T_{DLI,A}$ required for deep learning inference computation on vehicle A, the time $T_{DLI,B}$ required for deep learning inference computation on vehicle B, and the time $T_{DLI,C}$ required for deep learning inference computation on vehicle C is $T_{DLI,A} > T_{DLI,B} > T_{DLI,C}$ as shown in FIG. 4. Also, the deep learning inference unit 230 may generate a deep learning model having a different time required for deep learning inference computation in various ways, as shown in FIG. 4.

FIG. 4 illustrates an example of a deep learning model lightweight method for various types of deep learning models performing the same function to successfully providing an inference computation service according to a time required for deep learning inference in order to implement the adaptive deep learning inference unit 230. As a method of reducing the time required for inference computation by using deep learning models that perform the same function, there are 1) a pruning scheme to reduce the time required for inference computation by deleting computations including Weights, Channel, and Layers that minimize performance degradation of the deep learning model, 2) a quantization method to reduce the amount of computation and size by reducing a parameter representation scheme in the deep learning model in the order of FP32→FP16→INT8, and 3) a knowledge distillation method to train a small deep learning model with knowledge possessed by a conventional deep learning model. Through the above methods, it is possible to generate a deep learning model that performs the same function but has a different time required for inference computation.

In the embodiment of FIG. 3, by utilizing the methods of FIG. 4, the adaptive deep learning inference unit 230 utilizes various deep learning models secured in advance for the time $T_{DLI,A} > T_{DLI,B} > T_{DLI,C}$ required for deep learning inference computation to confirm deep learning inference service latency included in packet data transferred from the network latency measurement unit 220, select a model with the highest accuracy from among deep learning models capable of completion of inference computation within corresponding deep learning inference service latency, and provide a deep learning inference service.

According to the present invention, a deep learning model inference method is adjusted according to the time required for data transmission occurring in a wireless access network, and thus it is possible to provide a deterministic latency service in providing a mobile edge computing-based deep learning data analysis service to a terminal device that requests the service.

The present invention has been described in detail with reference to the preferred embodiments, but those skilled in the art can understood that the present invention may be carried out in specific forms different from those described herein without changing the technical spirit or essential features of the present invention. Therefore, the above-described embodiments are to be regarded as illustrative rather than restrictive. Also, the scope of the present invention is defined not by the detailed description but by the following claims, and all changes or modifications within the claims and their equivalents will be construed as being included in the technical scope of the present invention.

What is claimed is:

1. An adaptive deep learning inference apparatus configured to operate in a mobile edge computing environment including terminal devices and a wireless access network, the adaptive deep learning inference apparatus comprising an edge computing server, the edge computing server being configured to implement a software program to:
   in response to a terminal device of the terminal devices sensing data and requesting a deep learning inference service, adjust service latency required to provide a deep learning inference result according to a change in latency of the wireless access network, in order to provide deep learning inference data of deterministic latency with the service latency being fixed,
   wherein the software program includes
      a data receiving unit configured to receive the sensed data, the sensed data being transmitted by the terminal device over the wireless access network in order to request the deep learning inference service;
      a network latency measurement unit configured to measure or predict data latency required for data transmission between the terminal device and the edge computing server and calculate network latency;
   an adaptive deep learning inference unit configured to determine a deep learning model inference computation scheme capable of satisfying a required deterministic latency of the deep learning inference service in consideration of round-trip network latency calculated by the network latency measurement unit, and to perform a deep learning inference computation; and
   a data processing result transmission unit configured to transmit a result value of the deep learning inference computation of the adaptive deep learning inference unit to the terminal device using the wireless access network.

2. The adaptive deep learning inference apparatus of claim 1, wherein the terminal device is configured to:
generate a data packet by adding, to the data packet, time information regarding when the sensed data is transmitted, deep learning inference service latency, sensing data, and deep learning-based object detection service requirements, and
transmit the data packet.

3. The adaptive deep learning inference apparatus of claim 1, wherein the data receiving unit is configured to generate a packet by adding time information regarding when wireless data is received from the terminal device to the sensed data and to transmit the packet to the edge computing server.

4. The adaptive deep learning inference apparatus of claim 2, wherein the network latency measurement unit is configured to:
receive data from the data receiving unit, measure uplink data transmission latency required for uplink data transmission utilizing time information included in the data, predict downlink data transmission latency; and
calculate the network latency and calculate a time required for the deep learning inference computation using the calculated network latency and the deep learning inference service latency.

5. The adaptive deep learning inference apparatus of claim 1, wherein in order to determine a deep learning model inference computation scheme, the adaptive deep learning inference unit is configured to confirm deep learning inference service latency included in data transferred from the network latency measurement unit and to select a model with a highest accuracy from among deep learning models capable of completion of the deep learning inference computation.

6. The adaptive deep learning inference apparatus of claim 1, wherein in order to determine a deep learning model inference computation scheme, the adaptive deep learning inference unit is configured to determine a deep learning inference model candidate group using data transferred from the network latency measurement unit, select a model with a highest inference performance level from among deep learning inference models capable of deep learning computation processing out of the deep learning inference model candidate group within a time required for the deep learning inference computation, perform the deep learning inference computation, and transfer result data of the deep learning inference computation to the data processing result transmission unit.

7. The adaptive deep learning inference apparatus of claim 1, wherein the data processing result transmission unit is configured to transmit the result value to the terminal device.

8. The adaptive deep learning inference apparatus of claim 1, wherein
the deep learning inference service is an image analysis-based object detection service,
the terminal device is at least one autonomous vehicle traveling on a road, and the at least one autonomous vehicle transmits image data for object detection to a multi-access edge computing (MEC) platform through the wireless access network when requesting the image analysis-based object detection service, and
the MEC platform comprises the edge computing server and a base station configured to communicate with the at least one autonomous vehicle.

9. The adaptive deep learning inference apparatus of claim 8, wherein the data receiving unit and the data processing result transmission unit are included in the base station.

10. The adaptive deep learning inference apparatus of claim 8, wherein the network latency measurement unit and the adaptive deep learning inference unit are included in the edge computing server.

11. An adaptive deep learning inference method in a mobile edge computing environment performed in a mobile edge computing environment including terminal devices, a wireless access network, and an edge computing server, the adaptive deep learning inference method comprising the following operations performed by software of the edge computing server:
an operation of receiving sensed data transmitted by a terminal device of the terminal devices over the wireless access network in order to request a deep learning inference service;
a network latency measurement operation of measuring or predicting data latency required for data transmission between the terminal device and the edge computing server and calculating network latency;
an adaptive deep learning inference operation for determining a deep learning model inference computation scheme capable of satisfying a required deterministic latency of the deep learning inference service in consideration of round-trip network latency calculated in the network latency measurement operation and performing a deep learning inference computation; and
a data processing result transmission operation for transmitting a result value of the deep learning inference computation to the terminal device using the wireless access network;
wherein the operations performed by the software of the edge computing server are to adjust service latency required to provide a deep learning inference result according to a change in latency of the wireless access network and provide deep learning inference data of deterministic latency with the service latency being fixed.

12. The adaptive deep learning inference method of claim 11, wherein the data receiving operation comprises generating a packet by adding time information regarding when wireless data is received from the terminal device to the sensed data and transmitting the packet to the edge computing server.

13. The adaptive deep learning inference method of claim 11, wherein the network latency measurement operation comprises:
receiving data from the data receiving operation, measuring uplink data transmission latency required for uplink data transmission utilizing time information included in the data, predicting downlink data transmission latency;
calculating the network latency; and
calculating a time required for the deep learning inference computation using the calculated network latency and a deep learning inference service latency.

14. The adaptive deep learning inference method of claim 11, wherein in order to determine a deep learning model inference computation scheme, the adaptive deep learning inference operation comprises confirming deep learning inference service latency included in data transferred from the network latency measurement operation and selecting a model with a highest accuracy from among deep learning models capable of completion of the deep learning inference computation.

15. The adaptive deep learning inference method of claim 11, wherein in order to determine a deep learning model inference computation scheme, the adaptive deep learning inference operation comprises determining a deep learning inference model candidate group using the data transferred from the network latency measurement operation, selecting a model with a highest inference performance level from among deep learning inference models capable of deep learning computation processing out of the deep learning inference model candidate group within a time required for the deep learning inference computation, performing the deep learning inference computation, and then transferring result data of the deep learning inference computation to the data processing result transmission operation.

16. The adaptive deep learning inference method of claim 11, wherein the data processing result transmission operation comprises transmitting the result value to the terminal device.

17. The adaptive deep learning inference method of claim 11, wherein
the deep learning inference service is an image analysis-based object detection service,
the terminal device is at least one autonomous vehicle traveling on a road, and the at least one autonomous vehicle transmits image data for object detection to a multi-access edge computing (MEC) platform over the wireless access network when requesting the image analysis-based object detection service, and
the MEC platform comprises the edge computing server and a base station configured to communicate with the at least one autonomous vehicle.

* * * * *